United States Patent
Sato et al.

(10) Patent No.: US 7,570,381 B2
(45) Date of Patent: Aug. 4, 2009

(54) IMAGE FORMING APPARATUS INCLUDING TANDEM JOB STATUS INFORMATION

(75) Inventors: Junji Sato, Hachioji (JP); Minoru Asakawa, Hachioji (JP); Hiroshi Yamaguchi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 714 days.

(21) Appl. No.: 11/037,510

(22) Filed: Jan. 18, 2005

(65) Prior Publication Data
US 2006/0007475 A1  Jan. 12, 2006

(30) Foreign Application Priority Data
Jul. 7, 2004 (JP) ............................. 2004-200244

(51) Int. Cl.
*G06F 15/00* (2006.01)
*H04N 1/60* (2006.01)
(52) U.S. Cl. ..................... 358/1.15; 358/1.13
(58) Field of Classification Search ............... 358/1.15, 358/1.1, 474, 471, 400, 1.16, 1.17, 1.13; 347/129, 112, 111
See application file for complete search history.

(56) References Cited

U.S. PATENT DOCUMENTS

| | | | | |
|---|---|---|---|---|
| 5,119,079 A | * | 6/1992 | Hube et al. | 715/823 |
| 5,408,417 A | * | 4/1995 | Wilder | 705/5 |
| 2002/0118387 A1 | * | 8/2002 | Patton | 358/1.15 |
| 2002/0174271 A1 | * | 11/2002 | Tanigawa et al. | 710/11 |
| 2003/0035132 A1 | * | 2/2003 | Tomita et al. | 358/1.14 |
| 2003/0142348 A1 | * | 7/2003 | Hiramatsu et al. | 358/1.15 |
| 2008/0218796 A1 | * | 9/2008 | Wanda | 358/1.15 |

FOREIGN PATENT DOCUMENTS

| | | |
|---|---|---|
| JP | 07-271727 | 10/1995 |
| JP | 11-313181 A | 11/1999 |
| JP | 2004-144994 A | 5/2004 |

OTHER PUBLICATIONS

Japanese Office Action (and English translation thereof) dated May 13, 2008, issued in a counterpart Japanese Application.

* cited by examiner

*Primary Examiner*—Gabriel I Garcia
(74) *Attorney, Agent, or Firm*—Frishauf, Holtz, Goodman & Chick, P.C.

(57) ABSTRACT

An image forming apparatus having: a communication section to connect the image-forming apparatus with other image forming apparatus for communication; a control section for enabling a tandem output function to transfer image information to and form the other image forming apparatus through the communication section and to cause a plurality of image-forming apparatuses to form images; and a job display section for displaying job status of each of the plurality of image forming apparatuses based on tandem job status information including tandem job status information of the other image forming apparatus obtained through the communication section.

16 Claims, 10 Drawing Sheets

FIG. 5

[0]
- JOB ID
- JOB KIND
- STATUS
- NUMBER OF READ SHEETS
- NUMBER OF SETS
- RESIDUAL NUMBER OF SHEETS
- RESIDUAL TIME
- TANDEM
- . . .

JOB ID = SERIAL JOB No. (0001 - 9999)
JOB KIND = 0 x 00 COPIER, 0x01 PRINTER, 0 x 02 SCANNER
STATUS = 0 x 00 OPERATING, 0 x 01 RESERVED, 0 x 02 STOPPED
NUMBER OF READ SHEETS = 0 x 000 - 0 x 9999, 0 - 9999 SHEETS
NUMBER OF SETS = 0 x 000 - 0 x 9999, 0 - 9999 SETS
RESIDUAL NUMBER OF SHEETS = 0x00000000 - 0x99999999, 0 - 99999999 SHEETS
RESIDUAL TIME = 0 x 001 - 0 x 9999, 1 - 9999 MINUTES
TANDEM = 0 x 00 WITHOUT TANDEM, 0 x 01 WITH TANDEM

[1]
- JOB ID
- JOB KIND
- STATUS
- NUMBER OF READ SHEETS
- NUMBER OF SETS
- RESIDUAL NUMBER OF SHEETS
- RESIDUAL TIME
- TANDEM
- . . .

FIG. 6

| JOB ID | MODE | STATUS | NUMBER OF SHEETS | NUMBER OF SETS | RESIDUAL SHEETS | TIME (MINUTES) | TANDEM |
|---|---|---|---|---|---|---|---|
| 0011 | COPIER | OPERATING | 60 | 100 | 1020 | 8 | WITH |
| 0012 | PRINTER | RESERVED | 15 | 10 | 150 | 2 | WITHOUT |
| 0013 | PRINTER | RESERVED | 1 | 1 | 1 | 1 | WITHOUT |
| 0014 | COPIER | RESERVED | 3 | 4 | 12 | 2 | WITH |

Tabs: COPY | SCANNER | STORE | READOUT | JOB CONTROL | MACHINE STATUS

JOB PRIORITIZING/ DELETE etc. POSSIBLE

ORIGINAL COUNT 60 | RESERVED JOB 4 | RESIDUAL MEMORY 82% | RESIDUAL HDD 0%

Buttons: NEXT PAGE | PREVIOUS PAGE | OTHER MACHINE (141a)

| JOB ID | MODE | STATUS | NUMBER OF SHEETS | NUMBER OF SETS | RESIDUAL SHEETS | TIME (MINUTES) | TANDEM |
|---|---|---|---|---|---|---|---|
| 001 | COPIER | OPERATING | 60 | 100 | 1020 | 8 | WITH |
| 002 | COPIER | RESERVED | 3 | 4 | 12 | 2 | WITH |

COPY  SCANNER  STORE  READOUT  JOB CONTROL  MACHINE STATUS

JOB PRIORITIZING/ DELETE etc. POSSIBLE

ORIGINAL COUNT 60 | RESERVED JOB 2 | RESIDUAL MEMORY 90% | RESIDUAL HDD 0%

NEXT PAGE   PREVIOUS PAGE   THIS MACHINE

FIG. 9

| | | | | | | |
|---|---|---|---|---|---|---|
| COPY | SCANNER | STORE | READOUT | JOB CONTROL | MACHINE STATUS | |

JOB PRIORITIZING/ DELETE etc. POSSIBLE

| ORIGINAL COUNT 60 | RESERVED JOB 4 | RESIDUAL MEMORY 82% | RESIDUAL HDD 0% |
|---|---|---|---|

| JOB ID | MODE | STATUS | NUMBER OF SHEETS | NUMBER OF SETS | RESIDUAL SHEETS | TIME (MINUTES) |
|---|---|---|---|---|---|---|
| 0011 | COPIER | OPERATING | 60 | 35 | 320 | 4 |
| 0012 | PRINTER | RESERVED | 15 | 10 | 150 | 2 |
| 0013 | PRINTER | RESERVED | 1 | 1 | 1 | 1 |
| 0014 | COPIER | RESERVED | 3 | 2 | 6 | 2 |

201
202
203
204

NEXT PAGE   PREVIOUS PAGE

200 in # IMAGE FORMING APPARATUS INCLUDING TANDEM JOB STATUS INFORMATION

BACKGROUND OF THE INVENTION

This invention relates to an image forming apparatus and an external processing apparatus for a tandem image forming system which causes plural image forming apparatus to output images in combination.

In recent years, as the highly networked information technology advances, copying machines, printers and multi-function devices have been digitalized and networked. As the result, a tandem image forming system has been in practical use which produces a lot of image output immediately by connecting plural digital copying machines to cause the digital copying machines to quickly make a lot of copies of original images read by a single image reader or to cause plural printers to quickly print out image data sent from a computer. Accordingly, in the tandem image forming system, it is desired to tell the processing status of tandem jobs visibly or in other ways.

In general, image forming apparatus manages its own job status and displays it on the display section such as a touch-sensitive panel or the like if necessary. FIG. 9 shows a display section 200 which now displays the processing status of respective jobs. Each job processing status 201 to 204 displays the job mode, operating status, number of remaining copies, and rest of time so that the operator can get the job status and the running status of respective apparatus at a glance.

Further, there has been proposed in a system which is connected to a network, a network-connected information processing unit collectively manages information about apparatus identification and running conditions, and displays the information on the display section of the information processing unit. (See Patent Document 1) As shown in FIG. 10, this system includes image processing units 251 to 258 such as facsimile units FAX, copying units COPY, and personal computers, a storage unit 260 which collectively stores information of ID and operating condition of each image processing unit, and a network which connects these image processing units and the storage unit 260. At least one of the image-processing units, for example, a personal computer 257 can collectively display these kinds of information on its display section 257a via network (Web).

Patent Document 1: Japanese Un-Examined Patent Publication H07-271727

However, conventional apparatus and systems do not consider the tandem function when displaying information. Therefore, they have a problem that we cannot tell whether the displayed jobs are related to tandem outputs and cannot get the running status of apparatus correctly. Further, we must read tandem job status on the display section of each apparatus or on the web. Since this tandem job status is individual and not related to the whole tandem status, it is difficult to see the whole tandem job status.

Further, the information (number of remaining copies and rest of time) displayed on the job display section belongs to each apparatus only. Therefore, we cannot see at a glance the information of number of remaining copies and rest of time in the whole tandem output.

SUMMARY OF THE INVENTION

In view of the foregoing, the main object of this invention is to provide an image forming apparatus and an external processing apparatus that enable the user to easily know the whole status of tandem jobs at a glance.

Specifically, an image forming apparatus, which is a first embodiment of this invention includes: a communication section to connect the image-forming apparatus with other image forming apparatus for communication; a control section for enabling a tandem output function to transfer image information to and from the other image forming apparatus through the communication section and to cause a plurality of image-forming apparatuses to form images; and a job display section for displaying job status of each of the plurality of image forming apparatuses based on tandem job status information including tandem job status information of the other image forming apparatus obtained through the communication section.

An image forming apparatus, which is a fifth embodiment of this invention includes: a communication section for connecting the image-forming apparatus with other image forming apparatus for communication; a control section for enabling a tandem output function to transfer image information to and from the other image forming apparatus through the communication section and to cause a plurality of image-forming apparatuses to form images; an apparatus information obtaining section for obtaining information of the other image forming apparatus containing tandem job status information; and an apparatus information transmitting section which sends, to another apparatus through the communication section, apparatus information containing tandem job status information of each of the plurality of image forming apparatuses so that a job display section of the another apparatus can display tandem job status of each of the plurality of image forming apparatuses.

BRIEF DESCRIPTION OF THE DRAWINGS

FIG. 5 shows the structure of job data in accordance with the embodiment.

FIG. 6 shows the status of jobs of the local image forming apparatus on the job display section in accordance with the embodiment.

FIG. 7 shows the status of jobs of the remote image forming apparatus on the job display section in accordance with the embodiment.

FIG. 9 is the job status display in a conventional image forming apparatus.

DETAILED DESCRIPTION OF THE PREFERRED EMBODIMENT

Below will be explained one embodiment of this invention with reference to the accompanying drawings.

Figure 1:
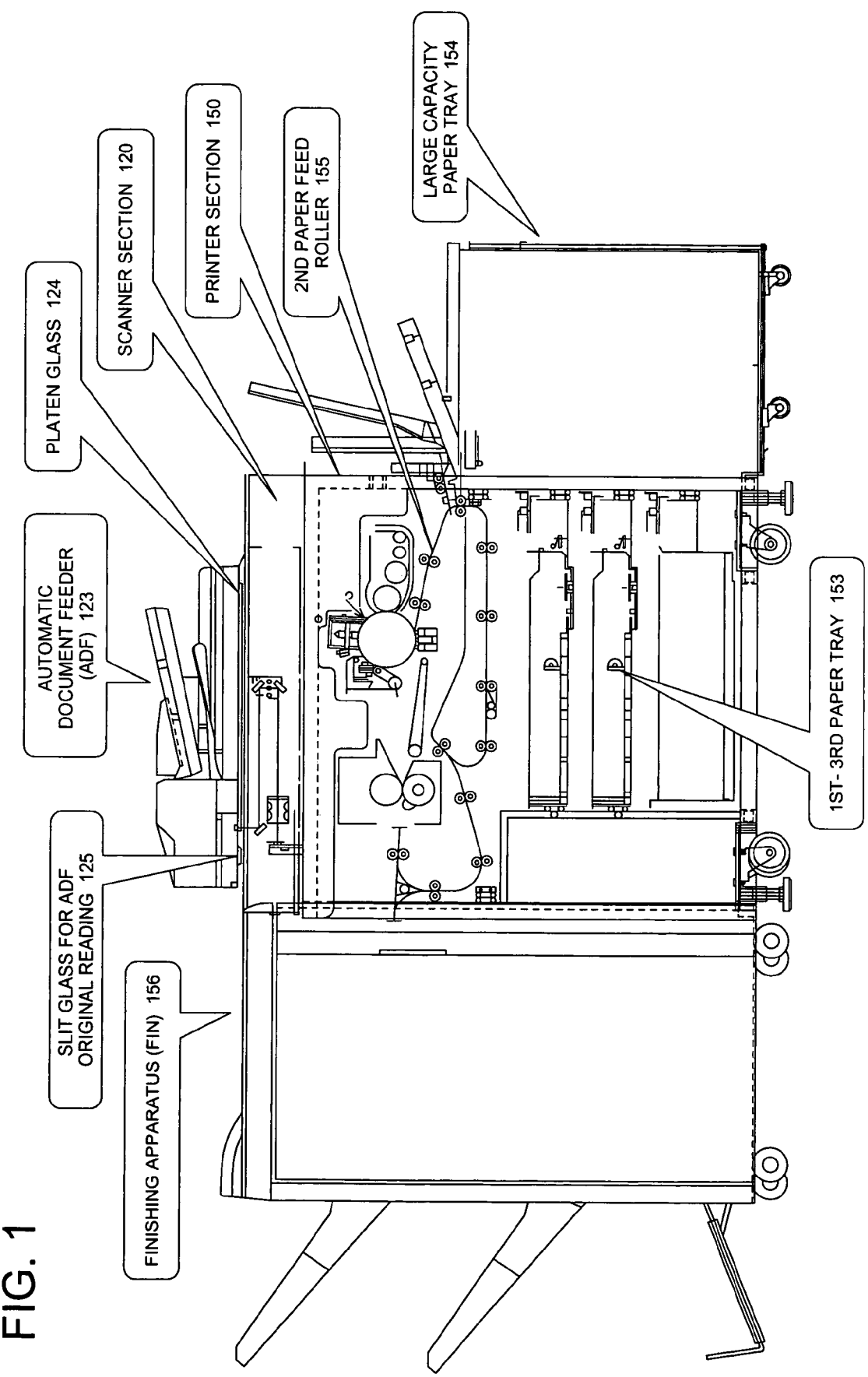
FIG. 1 is a schematic diagram showing the mechanical configuration of an image forming apparatus which is one embodiment of this invention.

FIG. 1 is a schematic diagram showing the mechanical configuration of an image forming apparatus 1 of this invention.

The image forming apparatus 1 is equipped, on the upper part, with a document reading section which includes a scanner section 120 made of CCD 121, an automatic document feeder (ADF) 123, a platen glass 124 on which a document is placed, and a slit glass for reading ADF document 125.

The image forming apparatus 1 is equipped, in the lower part, with first to third paper trays 153 and a large capacity paper tray 154 near the image forming apparatus 1. The second paper feed roller 155 is provided on the paper route from these trays. An image forming section including an LD 151 and others are provided in the downstream side of the paper movement. The printer section is made up with these image forming sections, first to third paper trays 153, large capacity paper tray 154, and second paper roller 155. In the downstream side of the image-processing section (paper ejection area) is provided a finishing apparatus (FNS) 156 to perform a desired post-processing (stapling, punching, and so on) on the image-formed paper. The image forming section includes a photosensitive material 151a, a charger 151b, a developer 151c, and a fixer 151d.

Figure 2:
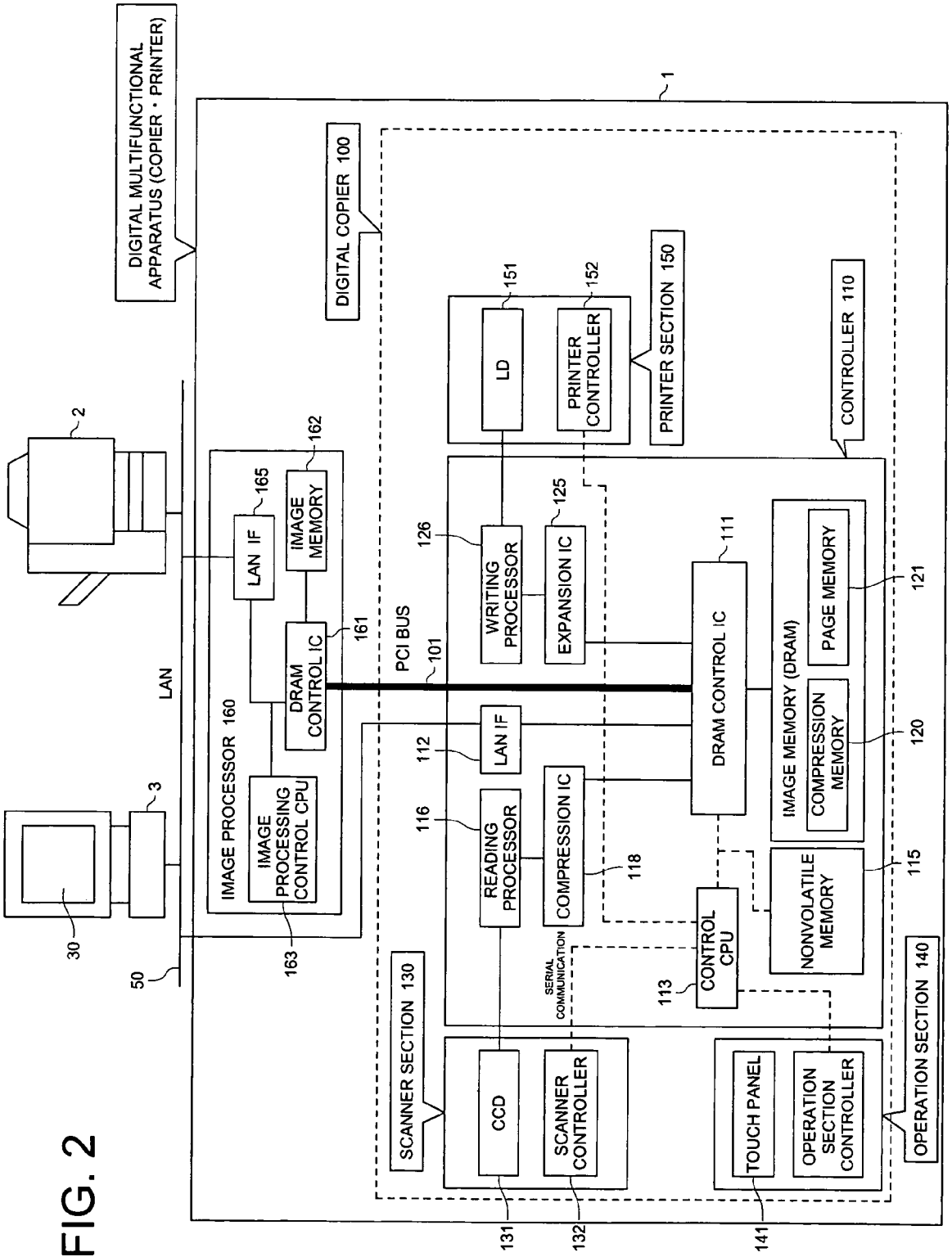
FIG. 2 is a functional diagram of a network configuration including functional blocks of FIG. 1.

The image forming apparatus 1 is a digital multi-function machine. As shown in FIG. 2, plural image forming apparatus are connected to LAN 50 to form a tandem image forming system and make tandem output. Although FIG. 2 shows only the image forming apparatus 2 is given as the other image forming apparatus, this invention is not limited to the number of image forming apparatus. In FIG. 2, a terminal unit 3 which is an external processing apparatus is equipped with a display section 30.

FIG. 2 shows a functional block diagram of the image forming apparatus 1 and the functional blocks are described in details below.

As shown in FIG. 2, the image forming apparatus includes an image processing section 160 which processes image data to be transferred to and from the outside of the apparatus through LAN and a digital copier 100 which is equipped with an image forming apparatus controller 110, a scanner section 130, an operation section 140, and a printer section 150.

The image forming apparatus controller 110 of the digital-copier 102 has LAN interface 112 to be connected to LAN 50 as above described. The LAN interface 112 is connected to DRAM control IC 111 of the image forming apparatus controller 110. Further, the image forming apparatus controller 110 is equipped with a control CPU 113 to which the DRAM control IC 111 and non-volatile memory 115 are connected. The non-volatile memory 115 stores programs to run the control CPU 113, setting data of the image forming apparatus 100, and data such as process control parameters. Naturally, the non-volatile memory 115 can store data on job information. Therefore, the non-volatile memory 115 can work also as a memory section of this invention. The control CPU 113 can read non-volatile data from the non-volatile memory 115. Further, arbitrary data can be stored as non-volatile data in the non-volatile memory 115. Further, the control CPU 113 can communicate with the other image forming apparatus 2 through the LAN interface 112 to transfer image data and image-processing commands to and from the image forming apparatus 2. In other words, the LAN interface 112 also has a function as a communication section of this invention. When outputting image information, the control CPU 113 can allocate outputs and post them to plural image forming apparatus. The tandem function can be accomplished under control of the control CPU 113.

The scanner section 130 includes a CCD 131 which reads images optically and a scanner control section 132 which controls the whole scanner section 130. The scanner control section 132 is connected to the control CPU 113 for serial transmission. The CCD 113 is connected to a reading processor 116 to receive and process image data from the CCD 131. The reading processor 116 is connected to a compression IC 118 which compresses image data and the compression IC 118 is connected to the DRAM control IC 111. The scanner section 130, the reading processor 116, and the compression IC 118 constitute an image reading section.

The operation section 140 is equipped with a touch-sensitive panel 141 working as an operation section and an operation section controller 142. The operation section controller 142 is connected to the control CPU 113. The operation section 140 can display the content of entered and set operation control conditions such as setting and operation commands of the image forming apparatus and further enables the operator to select image forming apparatus to output image data according to the tandem function. The touch-sensitive panel 141 has a function as a display section which displays required information so that the operator can recognize. One of items to be displayed by the touch-sensitive panel 141 is a job status display. In other words, the touch-sensitive panel 141 also functions as a job display section of this invention.

The DRAM control IC 111 is connected to image memory which includes compression memory 120 and page memory 121. The DRAM control IC 111 is further connected to an expansion IC 125 which decompresses the compressed data. A writing processor 126 is connected to the expansion IC 125. The writing processor 126 is connected to a laser diode (LD) 151 in the printer section 150 and processes data used for LD operation. The printer section 150 is equipped with a printer controller 152 to control the whole printer section 150. The printer controller 152 is connected to the control CPU 113.

The PCI bus 101 is connected to the DRAM control IC 111. The DRAM control IC 161 of the image processor 160 is also connected to the PCI bus 101. In the image processor 160, image memory 162 is connected to the DRAM control IC 161. Further, the DRAM control IC 161, the image processing control CPU 163, and the LAN interface 165 are connected to a common bus. The LAN interface 165 is connected to the LAN 50.

Next will be explained the basic operations of the image forming apparatus.

First, we describe a procedure of storing image data in the image forming apparatus 1.

Let's assume that the image forming apparatus 1 reads an image by the scanner section 130 and forms image data. The scanner section 130 optically reads a document by the CCD 131. In this case, the operation of the CCD 131 is controlled by the scanner control section 132 in response to a command from the control CPU 113.

The control CPU 113 runs by a program and submits commands to the scanner section 130 according to the operations of the operation section 140 and the terminal 3. The image data read by the CCD 131 is processed by the reading processor 116, compressed in a preset method by the compression IC 118, and then stored in the compression memory 120 through the DRAM control IC 111.

The image forming apparatus can also get image data from the outside, for example from LAN 50 through the DRAM control IC 161 and stores it in the image memory 162. The image data is created for example by an application program or the like in the terminal 3 or sent as a mail via Internet. The data is received the image processor 160 of the image forming apparatus through the LAN interface 165 and stored in the image memory 162 by the DRAM control IC 161. The data from the image memory 162 is temporarily stored in page memory 121 through the DRAM control IC 161, the PCI bus 101, and the DRAM control IC 111. The data stored in the page memory 121 is sent to the compression IC 118 through the DRAM control IC 111, compressed there, and stored in the compression memory 120 through the DRAM control IC 111.

As another example, the image data is created for example by image reading or the like in the image forming apparatus 2 and sent through LAN 50. The data is received by the image forming apparatus 1 through the LAN interface 112 of the apparatus 1, and stored in the compression memory 120 by the DRAM control IC 111. In tandem outputting, data is received by this procedure.

When the image forming apparatus is used as a scanner, image data is created by the scanner section 130 as explained above, sent from the compression memory 120 to the expansion IC 125 through the DRAM control IC 111, expanded there, sent to the page memory 121 via the DRAM control IC 111, and stored there. The data is then sent to the page memory 121 to the image memory 162 of the image processor 160 through the DRAM control IC 111, the PCI bus 101, and the DRAM control IC 161 of the image processor 160, and store there.

The image data stored in the image memory 162 can be sent to the terminal 3 and the other apparatus via the LAN interface 165 and the LAN 50.

Further, the image data stored in the compression memory 120 can be sent to the other image forming apparatus 2 through the DRAM control IC 111, the LAN interface 112 and the LAN 50. The image forming apparatus 2 can receive, store, and process the image data. When image data is sent to the other image forming apparatus 2 in tandem outputting, the similar procedure is used to send data through the LAN interface 112.

When the image forming apparatus 1 outputs image data, that is, when the image forming apparatus works as a copier or printer, the image forming apparatus 1 stores image data in the compression memory 120 as explained above, sends the image data from the compression memory 120 to the expansion IC 125 through the DRAM control IC 111, decompresses the image data there, sends the decompressed data to the writing processor 126, and writes the image data on the photosensitive member by the LD 151. In the printer section 150, the printer controller 152 controls the sections in response to commands from the control CPU 113. With this, the printer section 150 prints the image data on a preset transfer sheet (not shown in the drawing).

Figure 3:
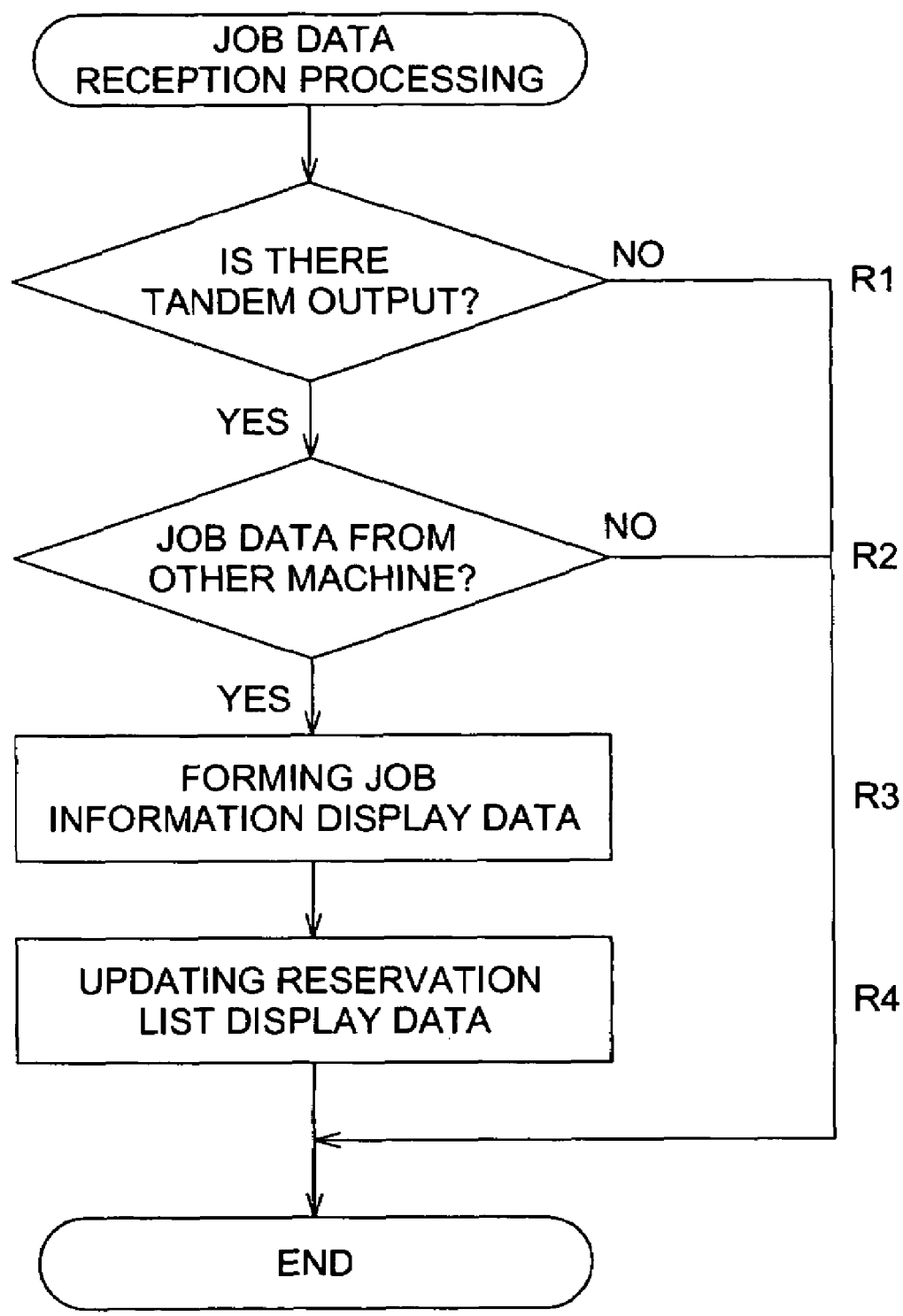
FIG. 3 is a flow chart showing a procedure of receiving job data in accordance with the embodiment.
Figure 4:
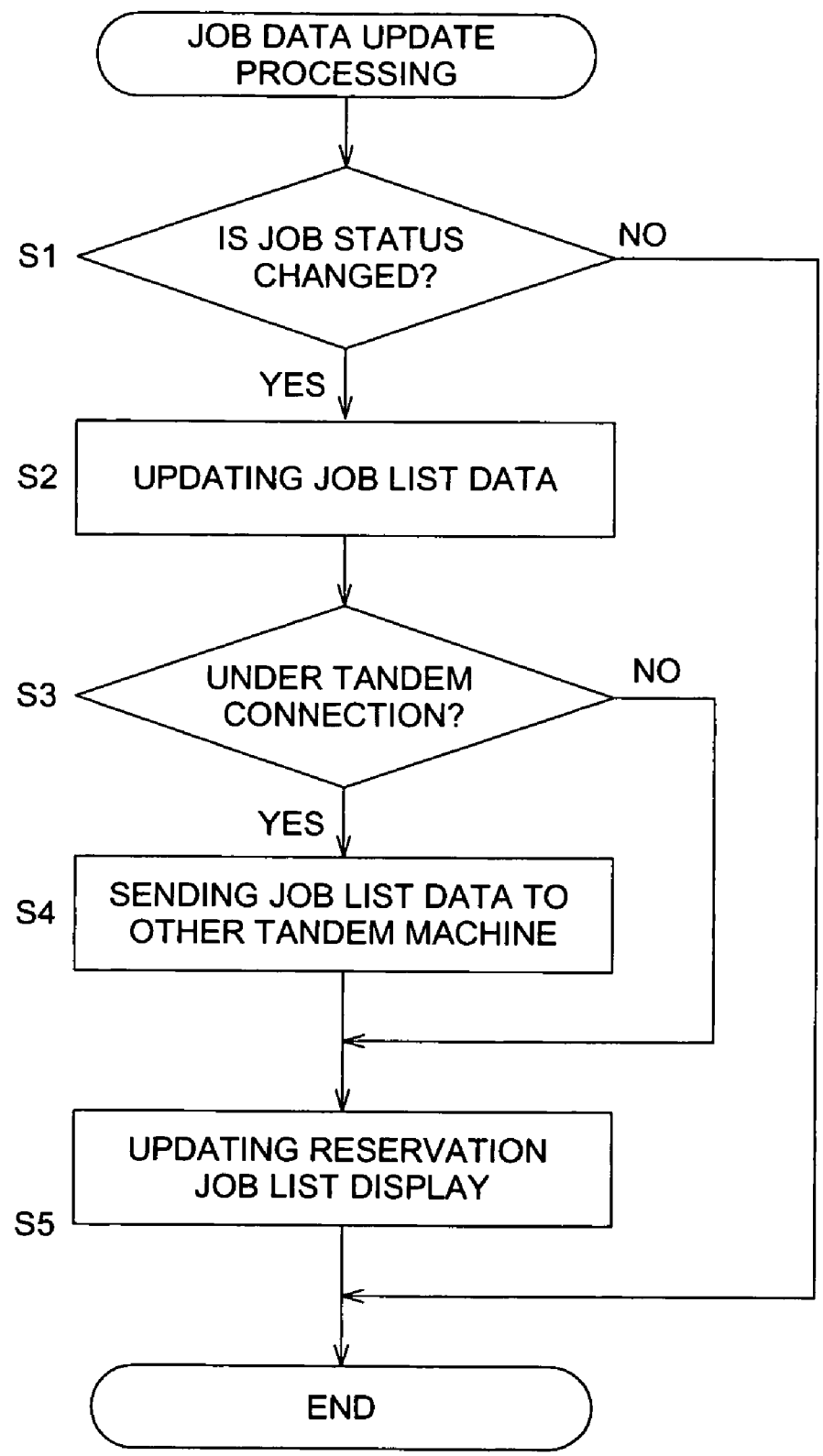
FIG. 4 is a flow chart showing a procedure of updating job data in accordance with the embodiment.

Next will be explained a procedure to display tandem jobs by the image forming apparatus with reference to a flow chart of FIG. 3.

First will be explained a procedure of receiving job data from the other image forming apparatus with reference to a flow chart of FIG. 3.

When receiving a job, the apparatus 1 checks whether there is a tandem output job (Step R1). There are to kinds of tandem jobs: when the remote image forming apparatus makes a tandem output and when the local image forming apparatus makes a tandem output. The image forming apparatus checks in terms of the above. When there is not a tandem output job, the image forming apparatus ends the job data reception processing. When finding there is a tandem output job at Step R1, the image forming apparatus checks whether the image forming apparatus received job list data from a remote image forming apparatus (Step R2). The job list data from the remote image forming apparatus can be obtained by a section to request the remote image forming apparatus to send information or information sent from the remote image forming apparatus voluntarily by a section to send information to the local image forming apparatus. These section can be built up by the control CPU and programs that submit commands to the CPU in respective image forming apparatus.

When the remote image forming apparatus 2 does not have job list data at Step R2, the local image forming apparatus 1 ends the job data reception processing. When the remote image forming apparatus 2 has job list data at Step R2, the local image forming apparatus 1 creates the job information display data (Step R3). The job information display data is created by the control CPU 113 in the control section 110 and stored in the non-volatile memory 115 at proper time. This kind of data can be stored as data for each image forming apparatus and as collective data of image forming apparatus. Then the image forming apparatus updates the reservation list display data to be displayed on the touch-sensitive panel (Step R4).

Next will be described a procedure to update a job list when the local image forming apparatus 1 changed its job status.

First, the image forming apparatus 1 checks whether its job status has changed (Step S1). When the job status remains unchanged, the image forming apparatus 1 ends the job list update processing. If the job status has changed, the image forming apparatus 1 updates its job list data and creates job information display data by the list data (Step S2). Next, the image forming apparatus 1 checks whether it is in a tandem connection (Step S3). When the apparatus 1 is not in a tandem connection, the apparatus 1 goes to Step S5 and updates the reservation job list. When the apparatus 1 is in a tandem connection, the local image forming apparatus 1 sends its updated job list data to the remote image forming apparatus in a tandem connection (Step S4). When receiving the list data, the remote image forming apparatus updates the job information display data as explained above. After Step S4 is complete, the image forming apparatus 1 goes to Step S5 and ends the job list update processing.

FIG. 5 shows the structure of job information display data stored in the image forming apparatus. Each data element is used as display data element for a reservation list or an old job list. When a new job is added, the image forming apparatus creates data for the new job and adds it to the existing data. As shown in FIG. 5, each data element includes items such as job ID, status, number of copies, number of remaining copies, and rest of time, and existence of tandem.

The image forming apparatus extracts data of jobs in reservation and in progress from the above job information display data, creates reservation list display data, and sends it to the operation section via the control CPU 113. FIG. 6 shows the status of jobs in the reservation list on the job display section 141 of the operation section 140 and particularly displays data of jobs of the local image forming apparatus only. This display contains items such as job ID, status, number of remaining copies, rest of time, and existence of tandem. When the REMOTE key 141a is pressed on the touch-sensitive panel 141, the screen changes to display the job status of the other image forming apparatus (see FIG. 7). FIG. 7 shows the job mode, status, number of remaining copies, rest of time, and existence of tandem of the remote image forming apparatus. When the LOCAL key 141b is pressed on this screen, the screen of FIG. 6 returns. In other words, the operator can change between the local and remote image forming apparatus to see their job status. When three or more image forming apparatus are connected in tandem, keys can be arranged on the touch-sensitive screen to select an image forming apparatus.

As the above job status display contains whether each job is related to a tandem output, the operator can know whether the job is a tandem output job at a glance.

Further, the above job status display for tandem output contains the total number of remaining copies of the image forming apparatus in tandem-connection. The remaining-copies calculating section calculates the number of remaining copies of each image forming apparatus in tandem-connection from the job status information of each image forming apparatus in tandem-connection. This section can be built up by the control CPU 113 and programs that submit commands to the CPU. Further, the above job status display for tandem output contains a maximum of rest-of-time of all image forming apparatus in tandem connection. This rest-of-time value is calculated by a remaining time comparing section. This section can be built up by the control CPU 113 and programs that submit commands to the CPU.

On the above job status display, the operator can know the job status which contains tandem jobs at a glance. Further, for tandem job output, the operator can immediately know the total number of remaining copies and the total rest-of-time of all jobs.

Although the description of the above embodiment assumes that each image forming apparatus gets job status information of the other image forming apparatus, it is possible that the remote apparatus information obtaining section of a selected image forming apparatus gets job status information of the other image forming apparatus containing tandem jobs and that the local information sending section of the selected image forming apparatus sends the job status information to the other image forming apparatus that requires to display the information. These section can be built up by the control CPU and programs that submit commands to the CPU in the selected image forming apparatus.

Further, although the above description assumes the image forming apparatus in a tandem connection display job status, it is possible that an external processing apparatus such as a terminal connected to the image forming apparatus in a tandem connection displays job status.

Figure 8:
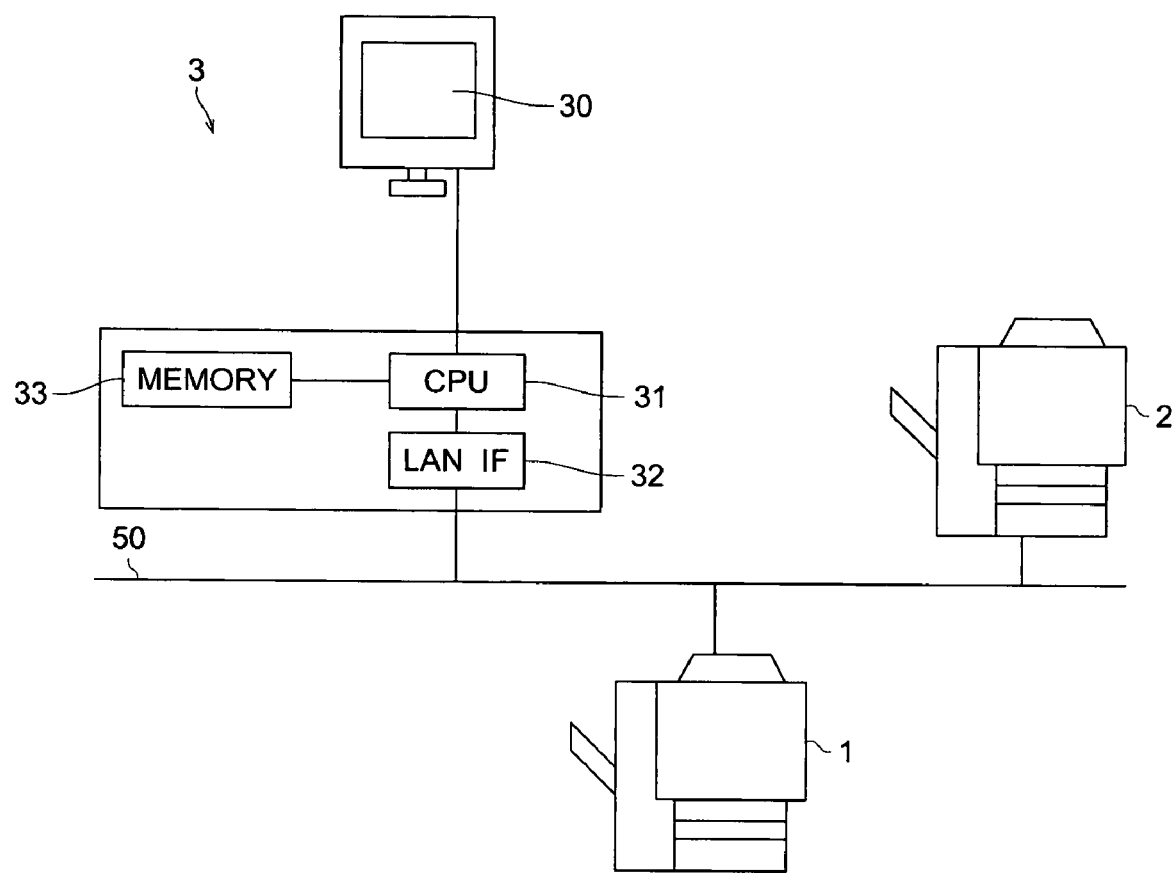
FIG. 8 is a schematic network configuration including the functional diagram of an external processing apparatus in accordance with one embodiment of this invention.
Figure 10:
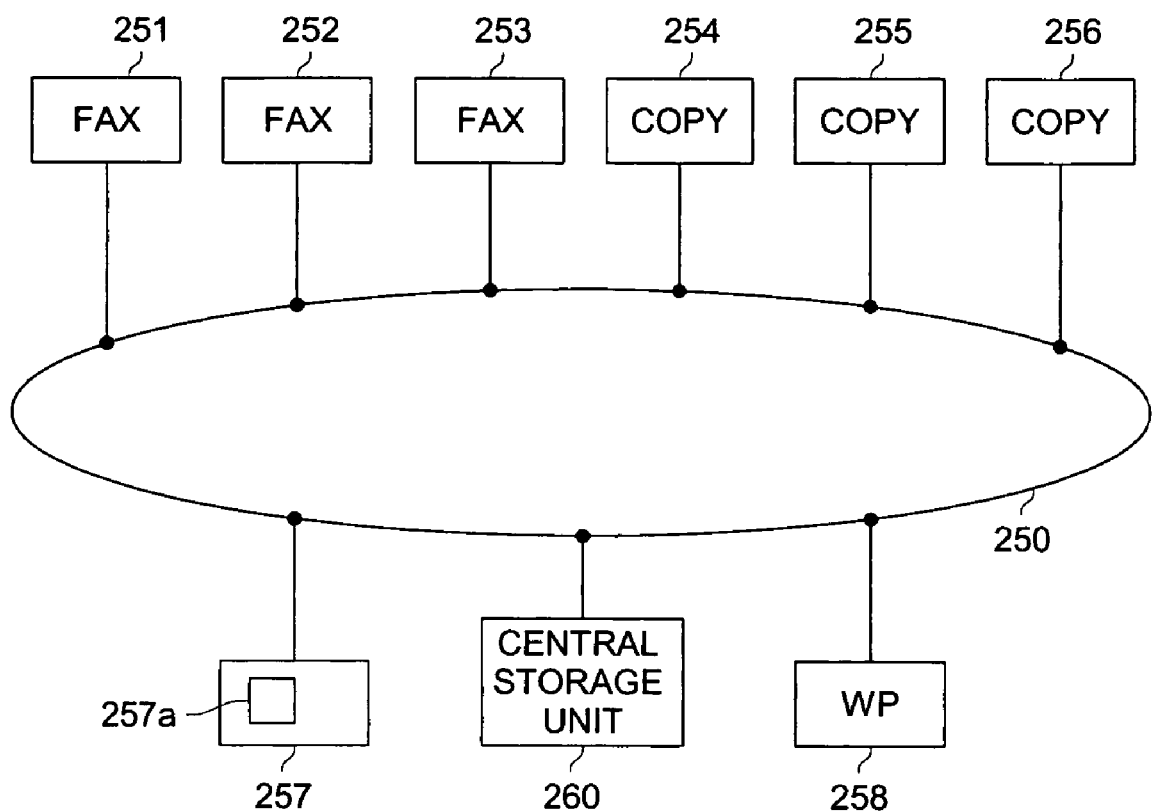
FIG. 10 shows a schematic network configuration to display a job status in a conventional information processing system.

FIG. 8 is a schematic diagram of an external processing apparatus which gets job status information of each image forming apparatus. The terminal 3 which is an external processing apparatus is equipped with a display section having a CRT unit, a control CPU 31 to control the whole unit, LAN interface 32 connected to the control CPU, and memory 33. The LAN interface 32 is connected to the above-described LAN 50 to which the above-described image forming apparatus and so on are connected. In this connection, the terminal 3 can transfer data to and from the image forming apparatus 1 and 2 via the LAN interface 32. Specifically, the LAN interface 32 constitutes the communication section of this invention. The terminal 3 can obtain job status information from the image forming apparatus 1 and 2 via the LAN interface 32. This data acquisition can be done by an apparatus information requesting section which includes a control CPU 31 and programs to submit commands to the CPU 31. Further, it is possible to get job status information which the image forming apparatus voluntarily output. The information can be stored in memory 33 that constitutes a memory section and displayed on the display section in the manner similar to those shown in FIG. 6 and FIG. 7. In short, the display section 30 constitutes the job display section of this invention. The collective job status management is enabled by displaying the job status of the external processing apparatus. Of course also in this case, it is possible that respective image forming apparatus display data containing job status of the other image forming apparatus.

Further, it is possible that the external processing apparatus collects and manages job status information and a selected image forming apparatus displays the job status information. Here, in the external processing apparatus, the apparatus information obtaining section collects job status information from respective image forming apparatus and the apparatus information transmitting section sends the job status information to the selected image forming apparatus. These section can be built up by the control CPU in the external processing apparatus and programs that submit commands to the CPU.

Preferred embodiments of this invention have been above described in detail. However, it is to be understood that the invention is not intended to be limited to the specific embodiments and variations may be made by one skilled in the art without departing from the spirit and scope of this invention.

This invention is summarized below from the above preferred embodiments.

The image forming apparatus which is a first embodiment of this invention includes: a communication section to connect the image-forming apparatus with other image forming apparatus for communication; a control section for enabling a tandem output function to transfer image information to and from the other image forming apparatus through the communication section and to cause a plurality of image-forming apparatuses to form images; and a job display section for displaying job status of each of the plurality of image forming apparatuses based on tandem job status information including tandem job status information of the other image forming apparatus obtained through the communication section.

The image forming apparatus which is a second embodiment of this invention is the image forming apparatus of the first embodiment wherein the job display section also functions as the operation section of the apparatus.

The image forming apparatus which is a third embodiment of this invention is the image forming apparatus of the first or second embodiment wherein the image forming apparatus is equipped with an apparatus information requesting section which requests the other image forming apparatus to send its information containing at least tandem job status through the communication section.

The image forming apparatus which is a fourth embodiment of this invention is any of the image forming apparatus of the first to third embodiments wherein the image forming apparatus is equipped with an apparatus information transmitting section which sends its information containing at least its tandem job status voluntarily or in response to a request from a remote image forming apparatus.

The image forming apparatus which is a fifth embodiment of this invention includes: a communication section for connecting the image-forming apparatus with other image forming apparatus for communication; a control section for enabling a tandem output function to transfer image information to and from the other image forming apparatus through the communication section and to cause a plurality of image-forming apparatuses to form images; an apparatus information obtaining section for obtaining information of the other image forming apparatus containing tandem job status information; and an apparatus information transmitting section which sends, to another apparatus through the communication section, apparatus information containing tandem job status information of each of the plurality of image forming apparatuses so that a job display section of the another apparatus can display tandem job status of each of the plurality of image forming apparatuses.

The image forming apparatus which is a sixth embodiment of this invention is any of the image forming apparatus of the third to fifth embodiments wherein the other apparatus is the above-described image forming apparatus.

The image forming apparatus which is a seventh embodiment of this invention is any of the image forming apparatus of the third to fifth embodiments wherein the other apparatus is an external processing apparatus which is connected for communication through the communication section.

The image forming apparatus which is an eighth embodiment of this invention is any of the image forming apparatus of the first to seventh embodiments wherein the job display section can display non-tandem job status.

The image forming apparatus which is a ninth embodiment of this invention is any of the image forming apparatus of the first to eighth embodiments, wherein the job display section can display to distinguish whether each job is a tandem job when displaying job status of each image forming apparatus.

The image forming apparatus which is a tenth embodiment of this invention is any of the image forming apparatus of the first to ninth embodiments wherein the job status display contains the number of remaining copies to be made and tandem job status information contains the total number of remaining copies of the image forming apparatus in a tandem connection.

The image forming apparatus which is an eleventh embodiment of this invention is any of the image forming apparatus of the first to tenth embodiments wherein the job status display contains rest-of-time values each of which is a maximum rest-of-time of job in plural image forming apparatus to which tandem jobs are allocated.

The image forming apparatus which is a twelfth embodiment of this invention is any of the image forming apparatus of the first to eleventh embodiments wherein the image forming apparatus is equipped with a remaining copies calculating section which receives tandem job status information of respective image forming apparatus which receive tandem jobs and totals the rests of copies in the tandem jobs.

The image forming apparatus which is a thirteenth embodiment of this invention is any of the image forming apparatus of the first to twelfth embodiments wherein the image forming apparatus is equipped with a remaining time comparing section which receives tandem job status information of respective image forming apparatus which receive tandem jobs, compares them, and obtains a maximum rest-of-time value.

The image forming apparatus which is a fourteenth embodiment of this invention is any of the image forming apparatus of the first to thirteenth embodiments wherein the image forming apparatus is equipped with a memory section which changeably stores job status information of the image forming apparatus and job status information sent from the other image forming apparatus through the communication section.

The image forming apparatus which is a fifteenth embodiment of this invention is the image forming apparatus of the fourteenth embodiment wherein the job display section displays job status according to job status information which is stored and sequentially changed in the memory section.

The external processing apparatus which is a sixteenth embodiment of this invention is equipped with a communication section to connect the image forming apparatus with plural image forming apparatus having a tandem function for transmission and a job display section which displays tandem job status of respective image forming apparatus according to tandem job status information which is obtained by the communication section.

The external processing apparatus which is a seventeenth embodiment of this invention includes a communication section which connects the external processing apparatus with plural image forming apparatus having a tandem function for transmission, an apparatus information obtaining section which obtains apparatus information of the other image forming apparatus containing tandem job status information of the other image forming apparatus, and an apparatus information transmitting section which sends apparatus information containing tandem job status information of respective image forming apparatus to the other apparatus through the communication section so that the job display section of the other image forming apparatus can display the tandem job status of respective image forming apparatus.

The external processing apparatus which is an eighteenth embodiment of this invention is any of the sixteenth and seventeenth embodiments of this invention wherein the job display section can display non-tandem job status of respective image forming apparatus.

The external processing apparatus which is a nineteenth embodiment of this invention is any of the sixteenth to eighteenth embodiments of this invention wherein the job display section can display to distinguish whether each job is a tandem job when displaying job status of each image forming apparatus.

The external processing apparatus which is a twentieth embodiment of this invention is any of the sixteenth to nineteenth embodiments of this invention wherein the job status display contains the number of remaining copies to be made and tandem job status information contains the total number of remaining copies of the plural image forming apparatus in a tandem connection.

The external processing apparatus which is a twenty-first embodiment of this invention is any of the sixteenth to twentieth embodiments of this invention wherein the job status display contains rest-of-time values each of which is a maximum rest-of-time of job in plural image forming apparatus to which tandem jobs are allocated.

The external processing apparatus which is a twenty-second embodiment of this invention is any of the sixteenth to twenty-first embodiments of this invention wherein the external processing apparatus is equipped with an apparatus information requesting section which requests the image forming apparatus to send apparatus information containing job status information via the communication section.

The external processing apparatus which is a twenty-third embodiment of this invention is any of the sixteenth to twenty-second embodiments of this invention wherein the external processing apparatus is equipped with a remaining-copies calculating section which receives tandem job status information of respective image forming apparatus which receive tandem jobs and adds up the rests of copies in the tandem jobs.

The external processing apparatus which is a twenty-fourth embodiment of this invention is any of the sixteenth to twenty-third embodiments of this invention wherein the external processing apparatus is equipped with a remaining time comparing section which receives tandem job status information of respective image forming apparatus which receive tandem jobs, compares them, and obtains a maximum rest-of-time value.

The external processing apparatus which is a twenty-fifth embodiment of this invention is any of the sixteenth to twenty-fourth embodiments of this invention wherein the external processing apparatus is equipped with a memory section which changeably stores job status information of the image forming apparatus and job status information sent from the other image forming apparatus through the communication section.

The external processing apparatus which is a twenty-sixth embodiment of this invention is any of the sixteenth to twenty-fifth embodiments of this invention wherein the job display section displays job status according to job status information which is stored and sequentially changed in the memory section.

In other words, the image forming apparatus (local apparatus) in accordance with this invention performs tandem outputting by obtaining tandem job status information from the other image forming apparatus (remote apparatus) via the communication section, and displaying the tandem job status information of local and remote apparatus on the job display section of the local and remote apparatus and the external processing apparatus according to the obtained tandem job status information and the tandem job status information of the local apparatus to present the information to the operator.

The tandem function can distribute image data which is read or received by a single image forming apparatus, allocate the required number of copies to plural image forming apparatus, and cause the image forming apparatus to print out the copies. Two image forming apparatus of the same type in a tandem connection increase the productivity twice and three image forming apparatus of the same type in a tandem connection increase the productivity three times.

The external processing apparatus of this invention obtains tandem job status information from the connected image forming apparatus via the communication section and displays their job status on its job display section to present the information to the operator.

The job display section can also display non-tandem job status of the image forming apparatus.

When displaying both tandem and non-tandem job status on the job display section, it is preferable to display to distinguish whether each job is a tandem job or not. With this, the operator can know whether jobs whose status is displayed are related to tandem outputs at a glance.

Further, the job status display can also contain the number of remaining copies and rest of time for outputting. In a tandem job display, the display section can display the total of copies (sheets) which remain to be printed on each tandem job allocated to each image forming apparatus as the number of remaining copies (sheets), and the greatest of the remaining time of each tandem job as the rest of time (residual time) for outputting. With this, the operator can know the number of remaining copies and the rest of time of the whole tandem job at a glance. These values of the whole tandem job can be calculated by for example, the remaining copies calculating section and the remaining time comparing section provided in the image forming apparatus or external processing apparatus. These section can be built up by the control CPU and programs that submit commands to the CPU in the image forming apparatus.

The job status information can be any as long as it enables recognition of job executing status and usually contain "Reserved" status and progress conditions. An example of job status information contains the following:

Job ID number
Job type (Copier, Printer, or Scanner)
Number of image faces
Number of remaining copies to be made
Rest of job time (residual time period until the end of outputting)

To obtain tandem job status information of a remote image forming apparatus, the local image forming apparatus can use its apparatus information request section and the external processing apparatus can use its apparatus information requesting section. The information obtained by these section contain at least tandem job status information of the remote image forming apparatus and can further contain non-tandem job status information and ID information to identify apparatus.

The above information in each image forming apparatus is sent, for example, by its apparatus information transmitting section which sends apparatus information in response to a request from the other image forming apparatus. This section can be what voluntarily sends information to other image forming apparatus. This section can be built up with a CPU which can control transmission and programs which submits commands to the CPU.

The job status information obtained by the image forming apparatus or external processing apparatus is displayed by its job display section. It can also be displayed by the display section of the other image forming apparatus or external processing apparatus by managing tandem job status information in each image forming apparatus as a server. The image forming apparatus and the external processing apparatus as a server can obtain tandem job status information of each image forming apparatus by the apparatus information obtaining section of the image forming apparatus and the external processing apparatus. The information can be obtained by requesting the other apparatus to send or receiving what is sent voluntarily by the other apparatus.

Information to be obtained and managed is apparatus information containing tandem status information which is sent to the other apparatus by the apparatus information transmitting section. This information transmission can be made voluntarily or in response to a request from the other apparatus.

Further, the job status information can be stored as data in a memory section provided in the image forming apparatus or external processing apparatus and updated when the status information is changed. The memory section can be any as long as it can store, read, and change data freely. It can be built up with a memory section such as memory or hard disk unit.

The external processing apparatus is connected to the image forming apparatus via the communication section and processes information if necessary. For example, the external processing apparatus can be a terminal made of a personal computer or a workstation connected to a network.

The communication section provided in the image forming apparatus or external processing apparatus enables bi-directional data transfer between apparatus and other information processing apparatus and is connected to a network such as LAN and leased lines.

The job display section of the image forming apparatus to display tandem job status can be a touch-sensitive panel which functions as the operation section or an independent display section. The job display section of the external processing apparatus can be what is fixed to the external processing apparatus or what is connected to the external processing apparatus (such as a CRT).

EFFECTS OF THE INVENTION

As described above, the image forming apparatus of this invention includes a communication section to connect the image forming apparatus with the other image forming apparatus for transmission, a tandem output function which transfers image information to and from other image apparatus through the communication section and causes a plurality of image forming apparatus to form images, and a job display section which displays a job status of respective image forming apparatus according to tandem job status information (including tandem job status information of the other image forming apparatus) which is obtained at least via the communication section. Therefore, as the image forming apparatus of this invention can display not only its job status but also the job status of the other image forming apparatus, the operator can know the executing status of tandem jobs at a glance.

Another image forming apparatus in accordance with this invention includes a communication section making this image forming apparatus connectable with the other image forming apparatus, a tandem output function which transfers image information to and from the other image forming apparatus through the communication section to form images on the image forming apparatus, an apparatus information obtaining section which obtains information of the other image forming apparatus containing its tandem job status information, and an apparatus information transmitting section which sends apparatus information containing tandem job status information of respective image forming apparatus to other image forming apparatus via the communication section so that the job display section of the other image forming apparatus can display the tandem job status of respective image forming apparatus. Therefore, this image forming apparatus can manage tandem status information of respective image forming apparatus, send the information to the other apparatus and cause the other apparatus to display the whole tandem job status on its job display section.

The external processing apparatus of this invention includes a communication section which connects the external processing apparatus with plural image forming apparatus having a tandem function for communication, and a job display section which displays tandem job status of each image forming apparatus according to the tandem job status information of each image forming apparatus obtained via the communication section. Therefore, as the external processing apparatus of this invention can manage tandem jobs and displays the tandem status. The operator can know the executing status of the whole tandem jobs at a glance.

Another external processing apparatus of this invention includes a communication section which connects the external processing apparatus with plural image forming apparatus having a tandem function for transmission, an apparatus information obtaining section which obtains apparatus information of the other image forming apparatus containing tandem job status information of the other image forming apparatus, and an apparatus information transmitting section which sends apparatus information containing tandem job status information of respective image forming apparatus to the other apparatus through the communication section so that the job display section of the other image forming apparatus can display the tandem job status of respective image forming apparatus. Therefore, the external processing apparatus of this invention can manage the tandem status information of respective image forming apparatus, send it to the other apparatus, and cause the other apparatus to display the whole tandem job status on its job display section.

Further, when the total of remaining copies of plural image forming apparatus is displayed on the tandem job status display, the operator can see the total number of remaining copies in the whole tandem processing at a glance.

Furthermore, when the maximum remaining time of plural image forming apparatus to which jobs are allocated is displayed on the tandem job status display, the operator can see the expected end of the whole tandem processing at a glance.

What is claimed is:

1. An image forming apparatus comprising:
   a communication section to connect the image-forming apparatus with a second image forming apparatus for communication;
   a control section for enabling a tandem output function to transfer image information to and from the second image forming apparatus through the communication section, and to execute an image forming job as a tandem job, in which a part of the image forming job is allocated to the second image forming apparatus, and in which a plurality of image-forming apparatuses, including the image forming apparatus and the second image forming apparatus, together form all images of the image forming job;
   a memory section which changeably stores job status information of the image forming apparatus and job status information sent from the second image forming apparatus through the communication section;
   a remaining copies calculating section which receives tandem job status information of each of the plurality of image forming apparatuses while the tandem job is executed, and which calculates at least one of a number of remaining copies and a number of remaining sets of copies to be made in the tandem job; and
   a job display section which displays a job status of the image forming apparatus and the second image forming apparatus based on tandem job status information which is obtained through the communication section and which comprises tandem job status information of the second image forming apparatus that has been allocated the part of the tandem job, wherein the job display section displays the job status based on the job status information which is stored and sequentially changed in the memory;
   wherein the displayed job status for each of the plurality of images forming apparatuses includes at least one of the number of remaining copies and the number of remaining sets, and with respect to tandem job status, the job display section is adapted to display at least one of the total number of remaining copies and the total number of remaining sets for the plurality of image forming apparatuses.

2. The image forming apparatus of claim 1, wherein the job display section functions as an operation section of the image forming apparatus.

3. The image forming apparatus of claim 1, further comprising an apparatus information requesting section which requests another apparatus to send information of the second image forming apparatus including the tandem job status information, through the communication section,
   wherein said another apparatus is one of the second image forming apparatus and an external processing apparatus to which the image forming apparatus is connected for communication through the communication section.

4. The image forming apparatus of claim 1, further comprising an apparatus information transmitting section which sends information including tandem job status of the image forming apparatus to another apparatus through the communication section,
   wherein said another apparatus is one of the second image forming apparatus and an external processing apparatus to which the image forming apparatus is connected for communication through the communication section.

5. The image forming apparatus of claim 4, wherein the apparatus information transmitting section sends the information in response to a request from said another apparatus.

6. The image forming apparatus of claim 4, wherein the apparatus information transmitting section sends the information voluntarily, without a request from said another apparatus.

7. The image forming apparatus of claim 1, wherein the job display section is adapted to display a job status of another job than the tandem job.

8. The image forming apparatus of claim 1, wherein the job display section is adapted to distinguish whether each displayed job is a tandem job when displaying the job status.

9. An image forming apparatus comprising:
- a communication section to connect the image-forming apparatus with a second image forming apparatus for communication;
- a control section for enabling a tandem output function to transfer image information to and from the second image forming apparatus through the communication section, and to execute an image forming job as a tandem job, in which a part of the image forming job is allocated to the second image forming apparatus, and in which a plurality of image-forming apparatuses, including the image forming apparatus and the second image forming apparatus, together form all images of the image forming job;
- a remaining time comparing section which receives and compares tandem job status information of each of the plurality of image forming apparatuses while the tandem job is executed, and obtains a maximum time remaining among times remaining in the tandem job in the plurality of image forming apparatuses; and
- a job display section which displays a job status of the image forming apparatus and the second image forming apparatus based on tandem job status information which is obtained through the communication section and which comprises tandem job status information of the second image forming apparatus that has been allocated the part of the tandem job, wherein the job display section displays job status based on job status information which is stored and sequentially changed in the memory section,
- wherein the displayed job status for each of the plurality of image forming apparatuses includes a time remaining, and with respect to tandem job status for the plurality of image forming apparatuses the job display section is adapted to display the maximum time remaining.

10. The image forming apparatus of claim 9, wherein the job display section functions as an operation section of the image forming apparatus.

11. The image forming apparatus of claim 9, further comprising an apparatus information requesting section which requests another apparatus to send information of the second image forming apparatus including the tandem job status information, through the communication section,
- wherein said another apparatus is one of the second image forming apparatus and an external processing apparatus to which the image forming apparatus is connected for communication through the communication section.

12. The image forming apparatus of claim 9, further comprising an apparatus information transmitting section which sends information including tandem job status of the image forming apparatus to another apparatus, through the communication section,
- wherein said another apparatus is one of the second image forming apparatus and an external processing apparatus to which the image forming apparatus is connected for communication through the communication section.

13. The image forming apparatus of claim 9, wherein the job display section is adapted to display job status of another job than the tandem job.

14. The image forming apparatus of claim 9, wherein the job display section is adapted to distinguish whether each displayed job is a tandem job when displaying the job status.

15. The image forming apparatus of claim 12, wherein the apparatus information transmitting section sends the information in response to a request from said another apparatus.

16. The image forming apparatus of claim 12, wherein the apparatus information transmitting section sends the information voluntarily, without a request from said another apparatus.

* * * * *